United States Patent
Dumais (10) Patent No.: US 8,959,653 B2
(45) Date of Patent: Feb. 17, 2015

(54) AUTOMATIC LICENSE KEY INJECTION

(75) Inventor: Paul Mark Joseph Dumais, Nepean (CA)

(73) Assignee: BlackBerry Limited, Waterloo, Ontario (CA)

(*) Notice: Subject to any disclaimer, the term of this patent is extended or adjusted under 35 U.S.C. 154(b) by 398 days.

(21) Appl. No.: 12/708,683

(22) Filed: Feb. 19, 2010

(65) Prior Publication Data

US 2010/0251346 A1  Sep. 30, 2010

Related U.S. Application Data

(60) Provisional application No. 61/165,187, filed on Mar. 31, 2009.

(51) Int. Cl.
*G06F 7/04* (2006.01)
*G06F 21/10* (2013.01)

(52) U.S. Cl.
CPC ..................... *G06F 21/10* (2013.01)
USPC ............ 726/27; 726/2; 726/17; 726/18

(58) Field of Classification Search
None
See application file for complete search history.

(56) References Cited

U.S. PATENT DOCUMENTS

| | | | |
|---|---|---|---|
| 5,563,946 A | 10/1996 | Cooper et al. | |
| 5,758,068 A | 5/1998 | Brandt et al. | |
| 7,383,545 B1 | 6/2008 | Yoo | |
| 7,703,142 B1 * | 4/2010 | Wilson et al. | 726/26 |
| 2004/0059938 A1 | 3/2004 | Hughes et al. | |
| 2005/0013592 A1 * | 1/2005 | Umemura et al. | 386/96 |
| 2005/0289072 A1 * | 12/2005 | Sabharwal | 705/59 |
| 2006/0085355 A1 | 4/2006 | Coley et al. | |
| 2007/0112684 A1 | 5/2007 | Coley et al. | |

OTHER PUBLICATIONS

Windows Marketplace for Mobile, . . . wikipedia.org/ . . . /Windows_Mobil . . .
Android Market, en.wikipedia.org . . . /Andriod_Market.
App Store, en.wikipedia.org/wiki/App_store.
FairPlay, http://en.wikipedia.org/wiki/FairPlay.
http://www.kalzumeus.com/2006/09/05/everything-you-need-to-know-about-registration-systems/.
http://www.siliconrealms.com/software-passport-product-information.html.
http://store.digitalriver.com/servlet/ControllerServlet?Action=DisplayProductActivationPage&Env=BASE&Locale=enUS&SiteID=ets.
http://docs.amazonwebservices.com/AmazonDevPay/latest/DevPayDeveloperGuide/index.html?WebActivation.html.
http://docs.amazonwebservices.com/AmazonDevPay/latest/DevPayDeveloperGuide/index.html?WebOverallProcess.html.
http:www.hypercom.com/services/hypersaferemotekeysystem.aspx.

(Continued)

*Primary Examiner* — Kaveh Abrishamkar
(74) *Attorney, Agent, or Firm* — Rowand LLP (57) ABSTRACT

A method, server and system for obtaining a licensed application is provided. In one example embodiment, the method comprises: receiving an application download request from a user of the electronic device by way of an input mechanism associated with the electronic; transmitting a download request from the electronic device to an application delivery server; receiving an application from the application delivery server at the electronic device; receiving a license key from the application delivery server; and automatically injecting the license key into the application.

14 Claims, 5 Drawing Sheets

(56) References Cited

OTHER PUBLICATIONS http://www.dl4all.com/other/4610-softwarepassport-armadillo-5.40.html.
"How to Register and Activate pcAnywhere Access Server 1.0", . . . symantec.com/../200606291035569 . . .
EPO, Extended European Search Report relating to application No. 10154157.1 dated Dec. 22, 2011.
Technical Details on Microsoft Product Activation for Windows XP, Internet Citation, Aug. 13, 2001, XP002398930, Retrieved from the Internet : URL:http://www.microsoft.com/technet/prodtechnol/winxppro/evaluate/xpactiv.mspx [retrieved on Sep. 14, 2006]*whole document*.
"KB316032: How to Troubleshoot Problem Problems that you may Experience When you Try to Activate an Office Product", Jun. 17, 2006.
Summons to Attend Oral Proceedings Pursuant to Rule 115(1) EPC.
CIPO, CA Office Action relating to Application No. 2,693,723 dated Feb. 6, 2014.

\* cited by examiner

AUTOMATIC LICENSE KEY INJECTION

TECHNICAL FIELD

The present disclosure relates generally to application delivery systems and, more particularly to a method, server and system for licensing software applications.

BACKGROUND

In order to prevent copyright infringement of software applications, manufacturers often employ authentication techniques to verify that a computer application is properly licensed.

For example, one commonly used technique relies on the use of a product key. A product key often consists of a series of alphanumeric characters which are manually entered by the user during or after the installation of the computer software application. The product key is often passed to an authentication function in the application to verify the authenticity of the product key.

Product keys may be inconvenient for users since they require the user to manually enter the product key when the program is installed or first run. Furthermore, the user may incorrectly enter the product key due to an error such as a typographical error, causing the application to be unable to run.

BRIEF DESCRIPTION OF THE DRAWINGS

Like reference numerals are used in the drawings to denote like elements and features.

DETAILED DESCRIPTION OF EXAMPLE EMBODIMENTS

In one example embodiment, the present application provides a mobile communication device (also referred to herein as a mobile device). The mobile communication device includes a communication subsystem for communicating with an application delivery server. The device further includes a display and an input mechanism for receiving a request from a user to download an application. The mobile communication device also includes a controller for controlling the operation of the mobile communication device and an application store client associated with the controller, the application store client being configured to: receive the request from the user to download the application; transmit a download request to an application delivery server; receive the application from the application delivery server; receive a license key from the application delivery server; and automatically input the license key into the application.

In another example embodiment, the present application provides a method of obtaining a licensed application on an electronic device including: receiving an application download request from a user of the electronic device by way of an input mechanism associated with the electronic; transmitting a download request from the electronic device to an application delivery server; receiving an application from the application delivery server at the electronic device; receiving a license key from the application delivery server; and automatically injecting the license key into the application.

In yet another example embodiment, the present application provides an application delivery server. The application delivery server includes a communication subsystem for communicating with an electronic device and a memory for storing applications. The application delivery server further includes: at least one controller for controlling the operation of the application delivery server, the at least one controller being configured to: receive a download request from an electronic device to download an application; retrieve the requested application; transmit the requested application to the electronic device; retrieve a license key for the application; and transmit the license key to the electronic device for automatic injection into the application.

In yet another example embodiment, the present application provides a computer program product including a computer readable medium having encoded thereon computer executable instructions for obtaining a licensed application on an electronic device, including: computer executable instructions for receiving an application download request from a user of the electronic device by way of an input mechanism associated with the electronic; computer executable instructions for transmitting a download request from the electronic device to an application delivery server; computer executable instructions for receiving an application from the application delivery server at the electronic device; computer executable instructions for receiving a license key from the application delivery server; and computer executable instructions for automatically injecting the license key into the application.

Other example embodiments of the present application will be apparent to those of ordinary skill in the art from a review of the following detailed description in conjunction with the drawings.

Embodiments of the present application are not limited to any particular operating system, mobile device architecture, server architecture, or computer programming language.

Figure 1:
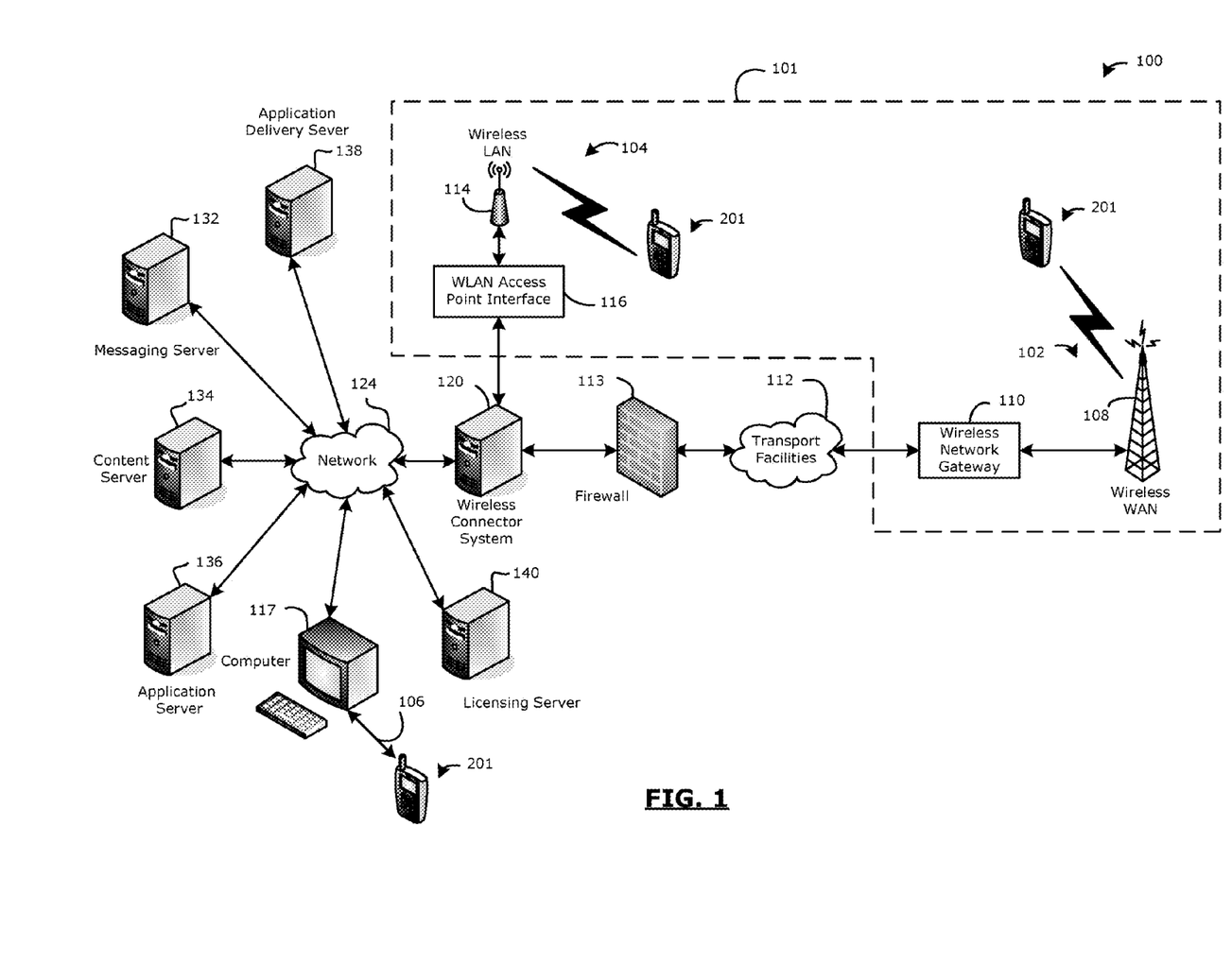
FIG. 1 is a block diagram illustrating a communication system including a mobile communication device and an application delivery server to which example embodiments of the present disclosure can be applied.

In order to facilitate an understanding of one possible environment in which example embodiments described herein can operate, reference is first made to FIG. 1 which shows in block diagram form a communication system 100 in which example embodiments of the present disclosure can be applied. The communication system 100 includes a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless network 101 which may include one or more of a Wireless Wide Area Network (WWAN) 102 and a Wireless Local Area Network (WLAN) 104 or other suitable network arrangements. In some example embodiments, the mobile communication devices 201 are configured to communicate over both the WWAN 102 and WLAN 104, and to roam between these networks. In some example embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some example embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further include a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some example embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 includes a wireless network which, in some example embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other example embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 also allows the mobile communication devices 201 to access an application delivery server 138. The application delivery server 138 is configured to deliver applications to the mobile devices 201 upon request by the mobile device 201. Applications are programs that include instructions for the mobile device 201 which provide a user of the mobile device 201 with tools to accomplish a task. By way of non-limiting example, the applications may include word processions applications, media player applications, database applications, games, etc. The application delivery server 138 may be configured to act as an application store to permit users of the mobile communication devices 201 to purchase applications for delivery to their mobile communication devices 201 through the wireless network 101.

The wireless connector system 120 may further include a licensing server 140 for generating and/or providing licensing information, such as a license key, to the application delivery server 138 or to the mobile communication device 201.

The wireless connector system 120 typically provides a secure exchange of data (e.g., email messages, personal information manager (PIM) data, and IM data) with the mobile communication devices 201. In some example embodiments, communications between the wireless connector system 120 and the mobile communication devices 201 are encrypted. In some example embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some example embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 102 to the wireless connector system 120. The wireless connector system 120 then sends the data packets to the appropriate connection point such as the messaging server 132, content server 134, application servers 136, application delivery server 138 or licensing server 140. Conversely, the wireless connector system 120 sends data packets received, for example, from the messaging server 132, content server 134, application servers 136, application delivery server 138 or licensing server 140 to the wireless network gateway 110 which then transmit, the data packets to the destination mobile communication device 201. The AP interfaces 116 of the WLAN 104 provide similar sending functions between the mobile communication device 201, the wireless connector system 120 and network connection point such as the messaging server 132, content server 134, application server 136, application delivery server 138 and licensing server 140.

The network 124 may include a private local area network, metropolitan area network, wide area network, the public Internet or combinations thereof and may include virtual networks constructed using any of these, alone, or in combination.

A mobile communication device 201 may alternatively connect to the wireless connector system 120 using a computer 117, such as desktop or notebook computer, via the network 124. A link 106 may be provided for exchanging information between the mobile communication device 201 and computer 117 connected to the wireless connector system 120. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may include one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system includes one possible communication network configuration of a multitude of possible configurations for use with the mobile communication devices 201. The teachings of the present disclosure may be employed in connection with other types of networks and associated devices that are effective in implementing or facilitating wireless communication. Suitable variations of the communication system will be understood to a person of skill in the art and are intended to fall within the scope of the present disclosure.

Figure 2:
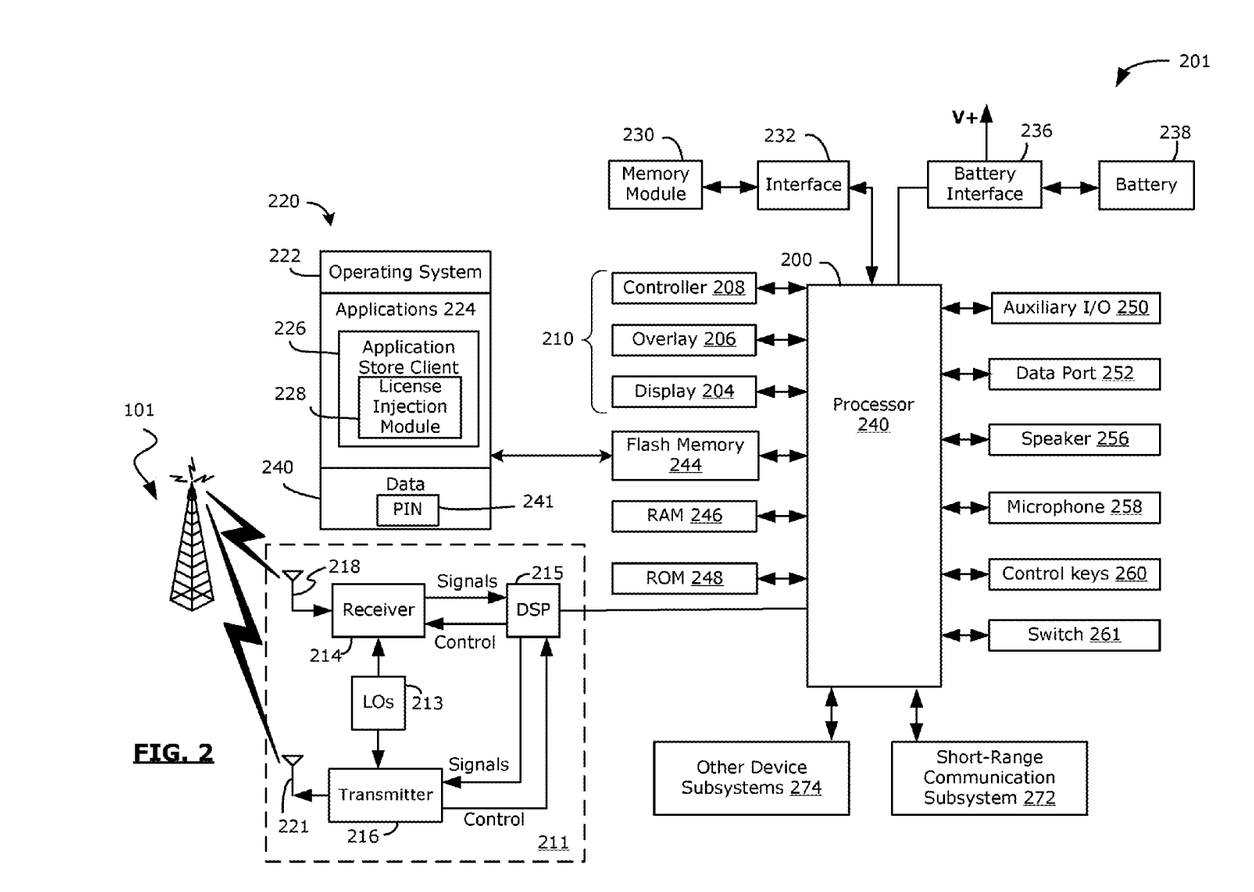
FIG. 2 is a block diagram illustrating the mobile communication device of FIG. 1 in accordance with one example embodiment of the present disclosure.

Reference is now made to FIG. 2 which illustrates a mobile communication device 201 in which example embodiments described in the present disclosure can be applied. The mobile communication device 201 is a two-way communication device having at least data and possibly also voice communication capabilities, and the capability to communicate with other computer systems, for example, via the Internet. Depending on the functionality provided by the mobile communication device 201, in various example embodiments the device 201 may be a data communication device, a multiple-mode communication device configured for both data and voice communication, a smartphone, a mobile telephone or a PDA (personal digital assistant) enabled for wireless communication, or a computer system with a wireless modem.

The mobile communication device 201 includes a controller 200 including at least one processor 240 such as a microprocessor which controls the overall operation of the mobile communication device 201, and a wireless communication subsystem 211 for exchanging radio frequency signals with the wireless network 101. The processor 240 interacts with the communication subsystem 211 which performs communication functions. The processor 240 interacts with additional device subsystems. In some example embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 act as an input mechanism to provide a touch-sensitive input device. The processor 240 interacts with the touch-sensitive overlay 206 via the electronic controller 208. In other example embodiments, the display 204 may not be a touchscreen display. Instead, the device 201 may simply include a non-touch display and one or more input mechanisms, such as, for example, a depressible scroll wheel.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, control keys 260, switch 261, short-range communication subsystem 272, and other device subsystems generally designated as 274. Some of the subsystems shown in FIG. 2 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the mobile communication device 201 and a single antenna may be shared by both receiver and transmitter, as is known in the art. As will be apparent to those skilled in the field of communication, the particular design of the communication subsystem 211 depends on the wireless network 101 in which mobile communication device 201 is intended to operate.

The mobile communication device 201 may communicate with any one of a plurality of fixed transceiver base stations 108 (FIG. 1) of the wireless network 101 within its geographic coverage area. The mobile communication device 201 may send and receive communication signals over the wireless network 101 after a network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

The processor 240 operates under stored program control and executes software modules 220 stored in memory such as persistent memory, for example, in the flash memory 244. As illustrated in FIG. 2, the software modules 220 include operating system software 222, software applications 224 which include an application store client 226 for requesting and receiving a software application from the application delivery server 138 (FIG. 1) and for injecting a license key received from the application delivery server 138 into the received application. The application store client 226 permits users of the mobile communication device 201 to connect to the application delivery server 138 and to browse or search for applications available for download to their mobile communication device 201. The injection of a license key may occur as part of an installation process in which the application is installed to the mobile device 201. In one example embodiment, injecting the license key into the application includes setting one or more properties associated with the application. For example, one property associated with the application may be a "serial number" or "license key" property. Prior to injecting the license key, this property may be set to nil. A license injection module 228 of the mobile communication device 201 may change this property to be equal to the received license key. The received license key may then be deleted from any other locations where it was temporarily stored, such as cache memory, so that it is only stored in the properties of the application.

A user of the mobile communication device 201 may request an application from the application delivery server 138 by interacting with the application store client 226 on the mobile device; for example, by using the touchscreen display 210, control keys 260 or other input mechanism. In response to receiving a request to download an application from the user, the application store client 226 of the mobile communication device 201 may transmit a download request to the application delivery server 138 and wait for the application delivery server 138 to transmit the specified application to the device 201. The mobile device 201 receives the application from the application delivery server 138. In some example embodiments, the application may require installation onto the mobile device 201 before it may be used. In such cases the application is installed to the mobile device 201. The installation may be initiated by any one or a combination of: the user of the mobile device, the application store client 226 of the mobile device 201, other applications 224, the downloaded application itself, or the operating system 222. That is, where installation is required, the installation may be automatically performed by an application or module, or it may be performed upon request by the user.

The application store client 226 further includes a license injection module 228 for receiving a license key from either the application delivery server 138 or the licensing server 140 and injecting the license key into the received application. The license key may be received before, during, or after the application is received. In some example embodiments, the license key may be packaged with the application by the application delivery server 138 and received at the mobile device when the application is received.

In some example embodiments, after the application store client receives the license key, it displays the license key on the display 204, permitting a user to make a hard-copy of the license key to retain for their records. The application store client 226 may prompt the user to create a hard-copy of the license key for their records and may ask the user to press one or more control keys 260 or other input sequence on any available input mechanisms when they have created a copy of the license key. The application store client 226 may wait for the user to press a key or provide another form of input before removing the license key from the display screen.

The application store client 226 may, among other things, be implemented through stand-alone software applications, or combined together in one or more of the operating system 222 and applications 224. In some example embodiments, the functions performed by the above identified applications 224 may be realized as a plurality of independent elements, rather than a single integrated element, and any one or more of these elements may be implemented as parts of other software applications.

Those skilled in the art will appreciate that the software modules 220 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 224 may include a range of other applications, including, for example, an address book application, a messaging application, a calendar application, and/or a notepad application. In some example embodiments, the software applications 224 include an email message application, a push content viewing application, a voice communication (i.e. telephony) application, a map application, and a media player application. Each of the software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may include an external communication link or interface, for example, an Ethernet connection. The mobile communication device 201 may include other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may include a vibrator for providing vibratory notifications in response to various events on the mobile communication device 201 such as receipt of an electronic communication or incoming phone call, or for other purposes such as haptic feedback (touch feedback).

In some example embodiments, the mobile communication device 201 also includes a removable memory module 230, such as a memory card, (typically including flash memory) and a memory card interface 232. Network access may be associated with a subscriber or user of the mobile communication device 201 via the memory module 230, which may be a Subscriber Identity Module (SIM) card for use in a GSM network or other type of memory card for use in the relevant wireless network type. The memory module 230 is inserted in or connected to the memory card interface 232 of the mobile communication device 201 in order to operate in conjunction with the wireless network 101.

The mobile communication device 201 stores data 240 in an erasable persistent memory, which in one example embodiment is the flash memory 244. In various example embodiments, the data 240 includes service data including information required by the mobile communication device 201 to establish and maintain communication with the wireless network 101. The data 240 may also include user application data such as email messages, address book and contact information, calendar and schedule information, notepad documents, image files, and other commonly stored user information stored on the mobile communication device 201 by its user, and other data. The data 240 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory. In some example embodiments, the data 240 may include identification data such as a Personal Identification Number ("PIN") 241 identifying either the user or the device 201. In some example embodiments, the PIN is a unique identifier assigned to the mobile communication device 201 during manufacturing of that device 201. The PIN may be saved in non-volatile memory so that the device 201 will retain the PIN even when it is powered off. In some example embodiments the identification data, such as the PIN 241 may be transmitted to the application delivery server 138 from the device 201 as part of the purchase, download, or licensing process associated with the delivery of an application or a license key from the application delivery server 138 to the mobile communication device 201.

The serial data port 252 may be used for synchronization with a user's host computer system (not shown). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some example embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 201 to the host computer system via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system for processing.

The mobile communication device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 221 or software applications 224 may also be loaded onto the mobile communication device 201 through the wireless network 101, the auxiliary I/O subsystem 250, the serial port 252, the short-range communication subsystem 272, or other suitable subsystem 274 other wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an application, a license key, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 101.

In the voice communication mode, the mobile communication device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display device 204 may also be used to provide an indication of the identity of a calling party, duration of a voice call, or other voice call related information.

Figure 3:
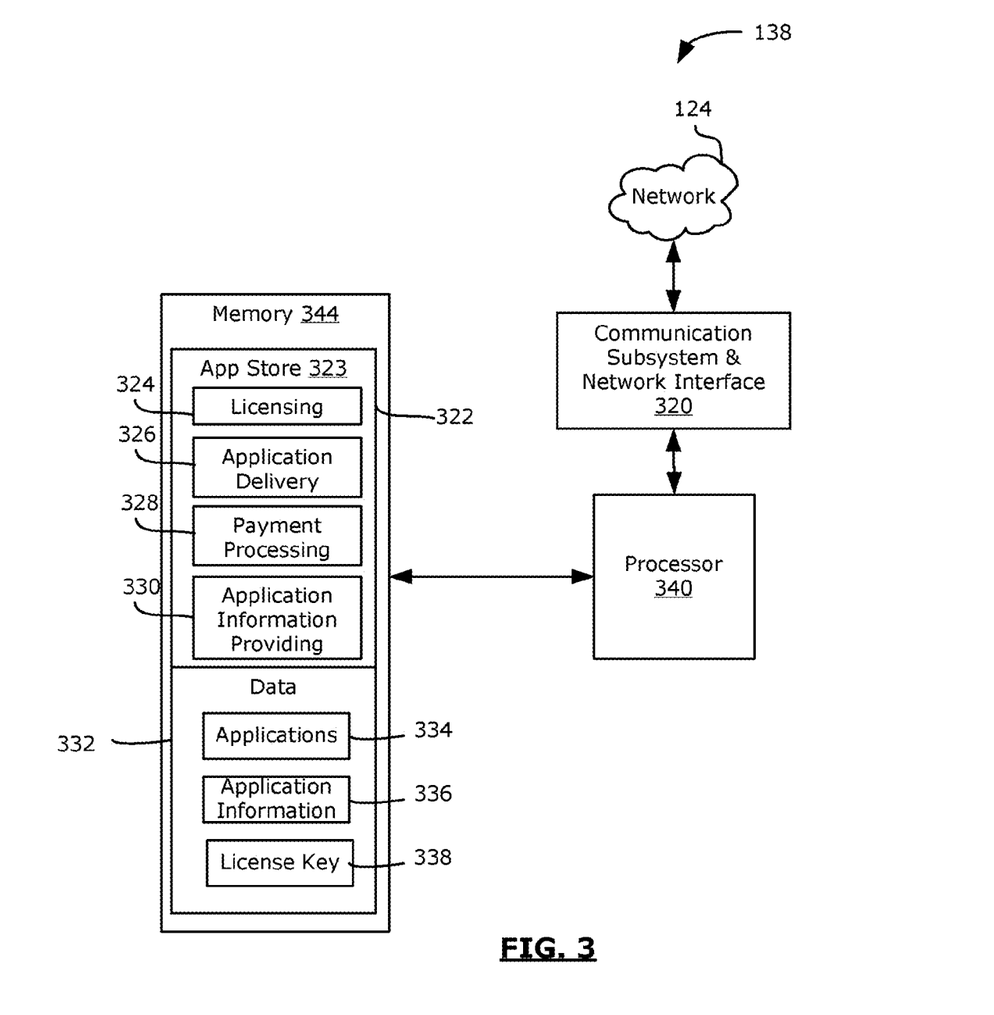
FIG. 3 is a block diagram illustrating the application delivery server of FIG. 1 in accordance with one example embodiment of the present disclosure.

Referring now to FIG. 3, an application delivery server 138 for use in accordance with one example embodiment of the present disclosure will now be described in greater detail. The application delivery server 138 may be implemented using any known general purpose computer technology, and may, for example be realized as one or more microprocessor based server computers implementing one or more server applications configured for performing the processes and functions described herein.

The application delivery server 138 may include one or more controller 300, such as a processor 340 for controlling the overall operation of the server 138. The application delivery server 138 may communicate with other devices connected to the network 124 through a communication subsystem and network interface 320. For example, the application delivery server 138 may communicate with the licensing server 140 (FIG. 1) or the mobile devices 201 (FIG. 1) via the wireless connector system 120 (FIG. 1).

The processor 340 operates under stored program control and executes software modules 322 stored in memory 344 such as persistent memory; for example, on a hard disk drive. As illustrated in FIG. 3, the software modules 322 include an application store module 323 for interfacing with the application store client 226 (FIG. 2) on mobile communication devices 201. The application store module 323 provides information to the mobile communication devices 201 regarding applications available for download and is configured to receive requests from mobile devices 201 to transmit one or more applications to the mobile device 201, and to retrieve and transmit the requested application to the mobile communication device 201.

The application store module 323 implements the functions of several components and sub-modules including, for example, an application information providing module 330 for retrieving application information 336 from a data store 332 and providing the application information to the mobile communication device 201. For example, the application information providing module 330 may be configured to transmit, to the mobile communication device 201, a list of applications which are available to be downloaded to the mobile communication device 201. The application information providing module 330 may interface with the application store client 226 (FIG. 2) on the mobile communication device 201 to provide browsing or search functions such as keyword based searching. For example, a user of the mobile device 201 may input one or more keywords or other search parameters, using the touchscreen 210 or the control keys 260 or other input mechanism of the mobile device. The search parameters may be transmitted to the application delivery server 138 and processed by the application information providing module 330 of the application store 323 to locate applications matching the specified search parameter(s). Application information 336 matching the search parameters may then be returned to the mobile communication device 201. Accordingly, the application information providing module 330 of the application delivery server 138, together with the application store client 226 of the mobile communication device 201 may permit a user to search or browse for an appropriate application 334. Application information 336 received by the mobile device 201 may be displayed to the user on the display 204.

The application store module 323 of the application delivery server 138 further includes an application delivery module 326 for receiving a request from a mobile device 201 for delivering an application to the mobile device 201, retrieving the application 334 associated with the request from the data store 332, and transmitting the application 334 to the mobile communication device 201. In some example embodiments, the application delivery module 326 may interface with a payment processing module 328. The payment processing module 328 accepts payment for delivery of an application 336 to the mobile communication device. For example, the payment processing module may post a charge to an account associated with the mobile communication device 201 or its user or may process a credit card transaction for the user of the mobile communication device 201.

The application store module 323 of the application delivery server 138 further includes a licensing module 324 for providing a license key to the mobile communication device 201. In some example embodiments, the license key is a single license key which may always be used, by any number of users, to license a specific application. In such example embodiments, the licensing module 324 may simply retrieve the license key 338 from a local or remote data store 332 and provide it to the mobile communication device 201 over the wireless network 101 or the link 106 (FIG. 1). Similarly, in other example embodiments, a license pool model may be utilized in which the local or remote data store 338 contains a pool of license keys 338 which are handed out one at a time to customers. For example, each license key 338 may be used only once.

In other example embodiments, a dynamic licensing method may be employed wherein a license key is generated specifically for the mobile communication device 201 and/or the user of the mobile communication device 201. For example, a license key may be generated, based at least in part, on the PIN 241 (FIG. 2) and/or user information such as an account name or email address associated with the user of the mobile communication device 201. The PIN 241 and user information may be transmitted by and received from the mobile communication device 201.

In some example embodiments, the license key 338 is generated by the licensing module 324 of the application delivery server 138. In other example embodiments, a distributed licensing method is used in which the licensing module 324 of the application delivery server 138 communicates with a licensing server 140 (FIG. 1) through the network 124 to obtain a license key. The licensing server 140 may be a third party server which is owned by an entity that is distinct from the entity which owns the application delivery server 138. Accordingly, by separating license key generation from application delivery, developers are able to create proprietary key generation algorithms.

In order to obtain a license from the licensing server 140 (FIG. 1), the licensing module 324 may perform an HTTP post to the licensing server, which may be a developers website, when it is time to generate a new key. The HTTP post may include the information which will be used to generate the key, such as the PIN 241 and/or user information. The HTTP post may also specify which application 334 the request relates to and a version number associated with that application 334. In response, the licensing server 140 generates and transmits the license key to the licensing module 324.

Referring still to FIG. 3, in example embodiments in which a payment processing module 328 is included in the application delivery server 138, the application delivery module 326 may be configured to only transmit the requested application 336 to the mobile communication device after a payment has been processed and verified. Alternatively, in some example embodiments, the application delivery module 326 may deliver the application 336 to the mobile communication device 201 before the payment is processed and verified but the license key may not be provided to the mobile communication device 201 by the licensing module 324 until after the payment has been processed and verified.

Figure 4:
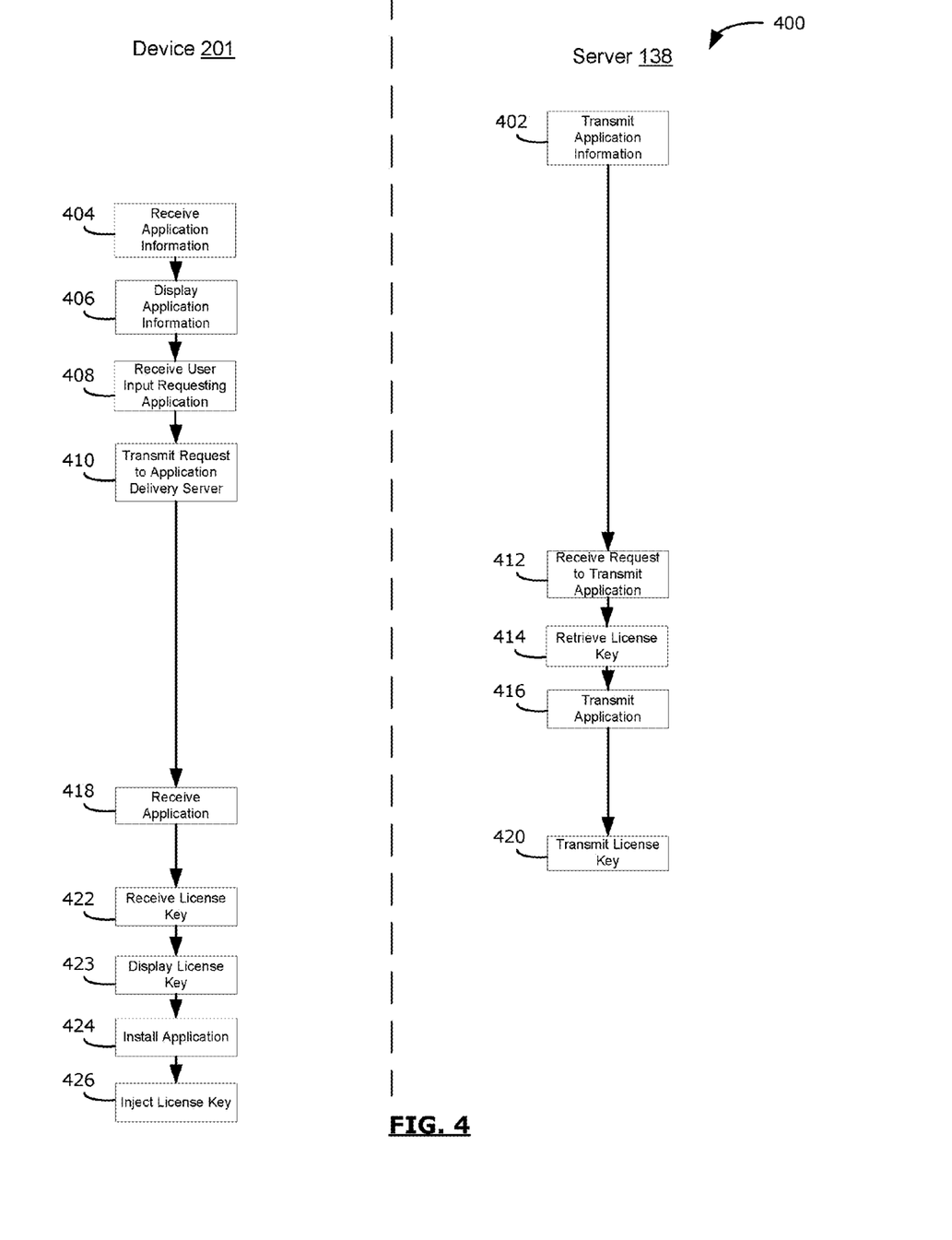
FIG. 4 is a flowchart illustrating a method for obtaining and delivering a licensed software application in accordance with example embodiments of the present disclosure.

An overview having been provided, reference is now made to FIG. 4 which illustrates a method 400 for providing an application to a mobile communication device 201 in accordance with one example embodiment of the present disclosure. The method 400 includes steps or operations performed by the requesting device, such as the mobile device 201 (FIG. 2), and steps or operations which are performed by the application delivery server 138 (FIG. 3). The application store module 323 (FIG. 3) may be configured to perform the server specific steps or operations of the method 400 and the application store client 226 (FIG. 2) of the mobile device 201 may be configured to perform the device specific steps or operations of the method 400.

At step 402, the application delivery server 138 may retrieve and transmit application information 336 to the mobile communication device 201. The application information may include information describing one or more applications 334. It may include information, such as, for example, a description of the functions provided for by the application 334, a price associated with the application 334, user or critic generated reviews of the application 334, a release date associated with the application 334, and an identifier associated with the application 334. The application information 336 may, in some instances be transmitted based on search parameters provided by the user of the mobile device 201. For example, the mobile device user may request information relating to applications of a specific type, for example, games. In response to receiving such a request, the application delivery server 138 may determine appropriate application information 336 corresponding to applications 334 meeting the desired criteria and transmit that application information 336 to the mobile device 201.

The application information 336 is received by the device 201 at step 404. The mobile device 201 may display at least some of the application information 336 to the user of the mobile device 201 using the display 204 at step 406. The information presented on the display 204 may include an option to purchase or download the application 334 associated with the application information. Using an input mechanism such as, for example, the touchscreen display 210, the control keys 260 or another input mechanism, a user may request the purchase or download of an application 334 associated with the application information 336 (Step 408).

After receiving a request from the user to purchase or download the application, the mobile device 201 may transmit a request (step 410) to the application delivery server 138 to request the transfer of the specified application 334 to the mobile communication device 201. The request may include information identifying the application 334 that the request relates to, such as, for example, an identifier associated with the application 334. The request is received at the application delivery server 138 at step 412.

At step 414, the licensing module 324 of the application delivery server 138 retrieves a license key 338 for the requested application 334. The license key 338 may be retrieved from a local or remote data store. In some example embodiments, the license key 338 may be retrieved from another licensing server 140.

Some licensing methods may rely on a single license key 338 which is associated with an application 334 and which is used for all users of the application 334 (This method may be referred to as a "single" license method). In other licensing methods, a pool of licensing keys 338 may be associated with an application 334 (This may be referred to as a license "pool" method). The license keys 338 in the pool may be handed out, or otherwise assigned, one at a time to each end user or mobile device 201. In other licensing methods, which will be discussed in greater detail below with reference to FIG. 5, dynamic licensing may be used (This may be referred to as a "dynamic" licensing method). In a dynamic licensing method, the license key 338 may be generated specifically for a user based on information of a predetermined type. For example, a license key 338 may be generated based on a PIN 241 associated with the mobile device 201, or another identifier which identifies the device 201 or its user.

The specific method of retrieving the license key 338 may vary between systems or applications. In some example embodiments, the method of retrieving a license key 338 will be determined by the developer of the specific application 338. For example, some developers may prefer to use the single license method, others may prefer to use the license pool method, and others may prefer the dynamic licensing method. In example embodiments which permit the developer to select which licensing method they prefer to use, the application information 336 which may be accessed by the application delivery server 138 may include information specifying the preferred licensing method. In such example embodiments, the licensing module 324 may be configured to determine, from the application information 336, the method to be used for retrieving the license key 338.

Each application 334 may include an authentication module for authenticating the application 334. That is, the application 334 may include computer executable instructions for determining whether a license key 338 which has been associated with the application 334 on the mobile communication device 201 is a valid license key. Accordingly, the license keys which are retrieved at step 414 are license keys which are capable of being authenticated by the authentication module of the application 334.

At step 416, the application is transmitted to the mobile device 201 and is received at the mobile device at step 418. Similarly, at step 420, the license key 338 is transmitted to the mobile device 201 and is received at the mobile device at step 422. It will be appreciated that the specific order of transmitting the application 334 and its associated license key 420 may be different than the order discussed above. For example, in some example embodiments, the license key 338 may be packaged with and transmitted with the application 334. In other example embodiments, the license key 338 may be transmitted prior to the application 334. Furthermore, it will be appreciated that, in some example embodiments, the application 334 may be transmitted (at step 416) prior to the license key 338 being retrieved (at step 414).

In some example embodiments, the license key 338 is displayed (step 423) on the display 204 of the mobile communication device 201 to permit a user of the device to create a backup copy of the license key 338 such as, for example, a hard copy of the license key 338. In some example embodiments, in order to increase the likelihood that the user will create a backup copy of the license key 338, the mobile device 201 may specifically prompt the user to do so.

Next, at step 424, in some example embodiments, the application may be installed to the mobile device 201. The installation of the application may occur automatically or may be user-initiated. Installation includes steps which are necessary or desirable to prepare the application 334 for use including, for example, decompressing the received application 334, placing a desktop icon on a home page of a graphical user interface associated with the mobile device 201 so that the user may launch the application 334, and creating a space to store files associated with the application 334, such as one or more folders.

Next, at step 426, the license key 338 is automatically injected into the application 334. The injection may occur as part of the installation method at step 424. The injection may be automatic and may not require any additional input from the user of the mobile device 201. The injection may be performed in response to receiving the license key 338.

In one example embodiment, injecting the license key 338 into the application 334 includes setting one or more properties associated with the application 334. For example, one property associated with the application may be a "serial number" or "license key" property. Prior to injecting the license key 338, this property may be set to nil. The license injection module 228 of the mobile communication device 201 may change this property to be equal to the received license key 338. The received license key 338 may then be deleted from any other locations where it was temporarily stored, such as cache memory, so that it is only stored in the properties of the application 334.

Figure 5:
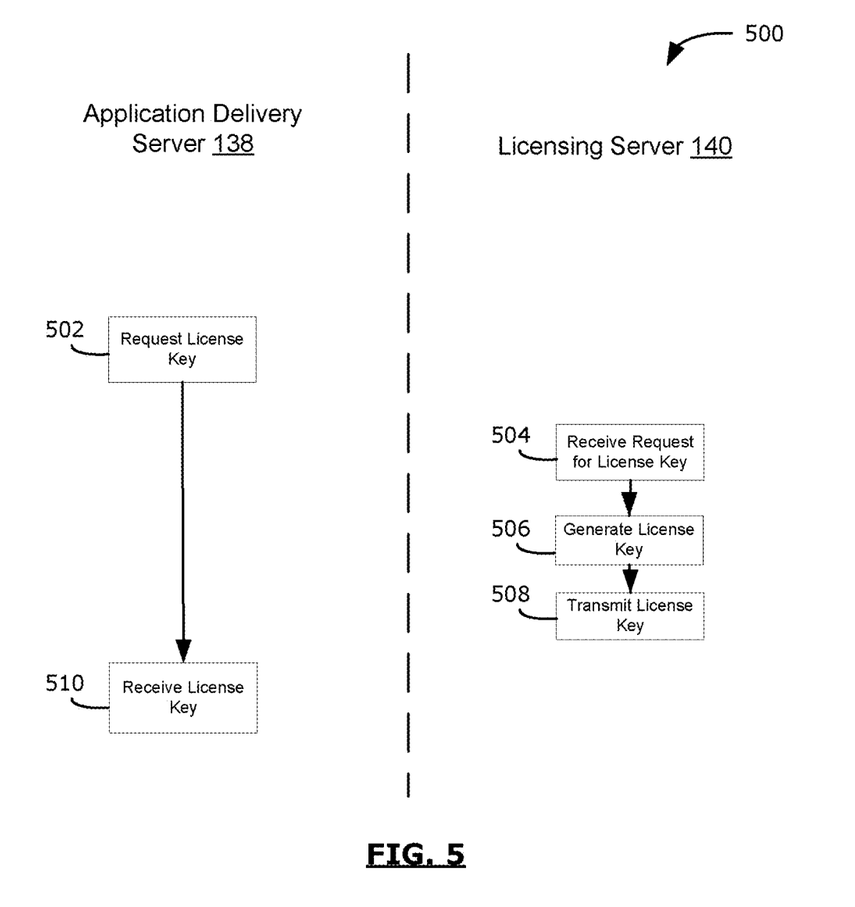
FIG. 5 is a flowchart illustrating a method for dynamically obtaining a license key in accordance with example embodiments of the present disclosure.

Referring now to FIG. 5, a method 500 for dynamically licensing the application 334 will be discussed. In this model, the license key 338 is specifically generated for a specific mobile device 201 or its user. The example embodiment of FIG. 5 includes steps for execution by the application delivery server 138 (FIG. 3) and steps for execution by the licensing server 140 (FIG. 1). It will be appreciated that the steps discussed with reference to FIG. 5 could be performed in other locations; for example, on other servers. For example, while the example embodiment of FIG. 5 is a distributed solution in which not all of the steps are performed in the same location, in some example embodiments, the steps may be performed on a single server, such as, for example, the application delivery server 138.

The distributed solution of FIG. 5 in which both a licensing server 140 and an application delivery server 138 are used, may be desirable in some systems. For example, where the application delivery server 138 and the licensing server 140 are not owned or operated by the same entity, the use of a separate licensing server permits the specific algorithm used to generate a license key to be kept secret from the operator of the application delivery server 138. For example, a developer may own and/or operate the licensing server 140 and a store may own and/or operate the application delivery server 138. Separating application delivery from license generation may be desirable since it allows the developer to rely on a generation algorithm which may not be supported by the application delivery server 138 and since it allows the generation algorithm to be kept secret.

At step 502, the application delivery server 138 transmits a request to obtain a license key 338 to the licensing server 140. The request may include identification information associated with one or both of the mobile device 201 requesting the application 334 or the user of the mobile device 201. For example, the request may include the unique PIN 241 associated with the mobile device 201 and/or an email address or other identifier associated with the user of the mobile device. The request may also include product identification information for identifying the application associated with the request. The product identification information may include a version number associated with the application. The request may be performed, for example, by submitting an Hyper-Text Transmission Protocol ("HTTP") post to a Universal Resource Locator ("URL") associated with the licensing server 140. The request is received at the licensing server 140 at step 504.

At step 506, the licensing server 140 generates the license key 338. The licensing server 140 generates the license key 338 according to a predetermined algorithm. The predetermined algorithm may rely on any identification information which was included in the request received at step 504 and which identifies the mobile device 201 or its user. For example, the algorithm may rely on the PIN 241 associated with the device. Accordingly, it is possible to generate a license key which will work only on the device 201 having the PIN 241 which was used to generate that license key.

At step 508, the generated license key is transmitted from the licensing server 140 and is received at the application delivery server at step 510.

In accordance with further example embodiments of the present disclosure, there are provided a computer program product including a computer readable medium having stored thereon computer executable instructions including instructions for practicing the methods of the application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile communication device and wireless connector system for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

FIGS. 4 and 5 are flowcharts of example embodiment methods for obtaining and delivering a licensed software application and for dynamically obtaining a licensed key. Some of the steps illustrated in the flowcharts may be performed in an order other than that which is described. Also, it should be appreciated that not all of the steps described in the flow chart are required to be performed, that additional steps may be added, and that some of the illustrated steps may be substituted with other steps.

The example embodiments of the present disclosure described above are intended to be examples only. Those of skill in the art may effect alterations, modifications and variations to the particular example embodiments without departing from the intended scope of the present disclosure. In particular, features from one or more of the above-described example embodiments may be selected to create alternate embodiments including a sub-combination of features which may not be explicitly described above. In addition, features from one or more of the above-described example embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A mobile communication device comprising:
a communication subsystem for communicating with an application delivery server;
a display;
an input mechanism for receiving a request to download an application;
a controller for controlling the operation of the mobile communication device; and
an application store client associated with the controller, the application store client being configured to: receive the request to download the application; transmit a download request to the application delivery server; receive the application from the application delivery server; receive a license key from the application delivery server; automatically inject the license key into the application, by modifying at least a license key property associated with the application to include the received license key; and verify the authenticity of the application using the license key.

2. The mobile communication device of claim 1, wherein the license key is injected into the application after the application is installed to the mobile communication device.

3. The mobile communication device of claim 1, wherein the application contains an authentication algorithm for verifying that the application is authentic by examining the license key.

4. The mobile communication device of claim 1, wherein the application store client associated with the controller is configured to transmit a unique identification number associated with the mobile communication device to the application delivery server prior to receiving the license key.

5. The mobile communication device of claim 1, wherein the license key is generated based on the unique identification number.

6. The mobile communication device of claim 1 wherein the application store client is further configured to display the license key on the display.

7. The mobile communication device of claim 1, wherein injecting the license key into the application is performed automatically in response to the license key being received at the mobile communication device.

8. A method of obtaining a licensed application on an electronic device comprising:
receiving an application download request from an input mechanism associated with the electronic device;
transmitting a download request from the electronic device to an application delivery server;
receiving an application from the application delivery server at the electronic device;
receiving a license key from the application delivery server at the electronic device;
automatically injecting the license key into the application by modifying at least a license key property associated with the application, to include the received license key, at the electronic device; and
verifying the authenticity of the application using the license key.

9. The method of claim 8 wherein the method is performed by an application store client associated with the electronic device.

10. The method of claim 8, further comprising: installing the application and wherein the license key is injected into the application after the application is installed to the electronic device.

11. The method of claim 8, wherein the application contains an authentication algorithm for verifying that the application is authentic by examining the license key.

12. The method of claim 8, further comprising: transmitting a unique identification number associated with the electronic device to the application delivery server prior to receiving the license key.

13. The method of claim 12, wherein the license key is generated based on the unique identification number.

14. The method of claim 8 further comprising: displaying the license key on a display.

* * * * *